United States Patent
Kadioglu

(10) Patent No.: US 10,146,665 B2
(45) Date of Patent: Dec. 4, 2018

(54) SYSTEMS AND METHODS FOR PROVIDING DYNAMIC AND REAL TIME SIMULATIONS OF MATCHING RESOURCES TO REQUESTS

(71) Applicant: ORACLE INTERNATIONAL CORPORATION, Redwood Shores, CA (US)

(72) Inventor: Serdar Kadioglu, Somerville, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 231 days.

(21) Appl. No.: 15/079,515

(22) Filed: Mar. 24, 2016

(65) Prior Publication Data
US 2017/0277620 A1    Sep. 28, 2017

(51) Int. Cl.
| | |
|---|---|
| G06F 11/36 | (2006.01) |
| G06F 7/58 | (2006.01) |
| G06F 9/50 | (2006.01) |
| G06Q 10/06 | (2012.01) |

(52) U.S. Cl.
CPC .......... *G06F 11/3664* (2013.01); *G06F 7/588* (2013.01); *G06F 9/50* (2013.01); *G06F 9/5005* (2013.01); *G06F 11/3684* (2013.01); *G06Q 10/063* (2013.01)

(58) Field of Classification Search
CPC .. G06F 11/3664; G06F 7/588; G06F 11/3684; G06F 9/50; G06F 9/5005
See application file for complete search history.

(56) References Cited

U.S. PATENT DOCUMENTS

| | | | | |
|---|---|---|---|---|
| 5,790,771 | A * | 8/1998 | Culbertson | .... G01R 31/318516 714/3 |
| 7,174,554 | B2 * | 2/2007 | Pierce | ................. G06F 11/3672 702/119 |
| 7,313,532 | B2 | 12/2007 | Mariamova et al. | |
| 7,478,419 | B2 | 1/2009 | Anderson et al. | |

(Continued)

OTHER PUBLICATIONS

Wikipedia; Assignment problem; pp. 1-4; downloaded on Mar. 23, 2016 from: http://en.wikipedia.org/wiki/Assignment_problem.

(Continued)

*Primary Examiner* — Viva Miller
(74) *Attorney, Agent, or Firm* — Kraguljac Law Group, LLC

(57) ABSTRACT

Computerized embodiments are disclosed for simulating requests and resources to be assigned to the requests by assignment logic. In one embodiment, a simulation session is initiated by generating test data that includes resource data, request data, and simulation state parameters. The test data is communicated to the assignment logic programmed to generate an assignment solution between resources and requests as represented by the resource data and the request data, respectively. The assignment solution is received from the assignment logic and the test data is updated. The test data can be updated by one or more of updating the simulation state parameters based on the assignment solution, adding at least one new request, or adding at least one new resource. The test data, as updated, is again communicated to the assignment logic and the process repeats until the simulation session is stopped.

20 Claims, 6 Drawing Sheets

(56) References Cited

U.S. PATENT DOCUMENTS

| | | | |
|---|---|---|---|
| 8,065,255 | B2 | 11/2011 | Colena et al. |
| 8,126,834 | B2 | 2/2012 | Chen et al. |
| 8,165,980 | B2 | 4/2012 | Chen et al. |
| 8,165,981 | B2 | 4/2012 | Colena et al. |
| 8,301,582 | B2 | 10/2012 | Huberman et al. |
| 8,447,716 | B2 | 5/2013 | Bagley et al. |
| 8,504,501 | B2 | 8/2013 | Colena et al. |
| 8,645,302 | B2 | 2/2014 | Chen et al. |
| 8,751,425 | B2 | 6/2014 | Bagley et al. |
| 9,588,819 | B2 | 3/2017 | Kadioglu et al. |
| 2002/0078432 | A1* | 6/2002 | Charisius ............... G06Q 10/06 717/102 |
| 2002/0124085 | A1* | 9/2002 | Matsuda ............. G06F 17/5022 709/226 |
| 2012/0123764 | A1* | 5/2012 | Ito ........................ G06F 9/5055 703/21 |
| 2012/0155264 | A1 | 6/2012 | Sharma |
| 2014/0089480 | A1 | 3/2014 | Zhu |
| 2015/0118756 | A1 | 4/2015 | Pollack |
| 2015/0242760 | A1* | 8/2015 | Miao ..................... G06N 99/005 706/12 |
| 2015/0348065 | A1 | 12/2015 | Doganata |
| 2016/0086081 | A1 | 3/2016 | Lee et al. |

OTHER PUBLICATIONS

Wikipedia; Generalized assignment problem; pp. 1-3; downloaded on Mar. 23, 2016 from: http://en.wikipedia.org/wiki/Generalized_assignment_problem.

Beasley, J. E.; OR-Library: Distributing Test Problems by Electronic Mail; pp. 1069-1072; downloaded on Mar. 28, 2016 from: http://people.brunel.ac.uk/~mastjjb/jeb/orlib/assigninfo.html; copyright 1990—Operational Research Society Ltd.

Naveh et al.; Workforce Optimization: Identification and assignment of professional workers using constraint programming; pp. 263-279; IBM Journal of Research and Development; vol. 51, No. 3/4, 2007.

Asaf et al.; Applying Constraint Programming to Identification and Assignment of Service Professionals; pp. 24-37; Principles and Practice of Constraint Programming—CP 2010, Lecture Notes in Computer Science, vol. 6308, 2010.

Richter et al.; Optimatch: applying constraint programming to workforce management of highly skilled employees; pp. 258-270; International Journal of Services Operations and Informatics (IJSOI), vol. 3, No. 3/4, 2007.

Zhu et al., "Meeting Scheduling System Based on Open Constraint Programming", Banks Pidduck et al. (Eds.): CAISE 2002, LNCS 2348, 5 pages, 2002.Springer-Verlag Berlin Heidelberg 2002.

Lecoutre et al., "Reasoning from Last Conict(s) in Constraint Programming", dated 2009, 39 pages.

Kovacs et al., "Constraint Programming Approach to a Bilevel Scheduling Problem", dated Mar. 4, 2010, 29 pages.

Hladik et al., "Solving Allocation Problems of Hard Real-Time Systems with Dynamic Constraint Programming", dated 2006, 10 pages.

Frisch et al.; "The Rules of Constraint Modelling", Artificial Intelligence Group, Dept. of Computer Science, Univ. of York, UK, 2005, 8 pages.

IBM, "WebSphere eXtreme Scale Overview", Available at: <http://www-01.ibm.com/support/knowledgecenter/SSTVLU_7.1.1/com.ibm.websphere.extremescale.doc/cxsoverview.html>, Retrieved on Aug. 27, 2015, 3 pages.

Kuhn, H. W. "The Hungarian Method for the Assignment Problem", Mar. 1955, pp. 83-97.

Milano et al., "Constraint Programming", Intelligenza Artificiale, vol. 3, No. 1-2, pp. 28-34, 2006.

Naveh et al., "Workforce Optimization: Identification and Assignment of Professional Workers Using Constraint Programming", Ibm J. Res. & Dev., vol. 51, No. 3/4, May / Jul. 2007, pp. 263-279.

Slaney, John, "Constraint Modelling: A Challenge for First Order Automated Reasoning", NICTA and the Australian National University, Jul. 2009, pp. 11-21.

Smith, Barbara M., "A Tutorial on Constraint Programming", School of Computer Studies Research Report Series, Apr. 1995, pp. 1-21.

Smith, Barbara M., "Modelling for Constraint Programming", Cork Constraint Computation Centre, University College Cork, Ireland, Sep. 2005, 18 pages.

\* cited by examiner

Representation of a Resource (Agent) Data Structure

| Agent ID | 50914 | |
|---|---|---|
| Skill/Level | laptops | high |
| Skill/Level | cell phones | low |
| Skill/Level | tablets | medium |
| Language/Level | English | medium |
| Language/Level | Chinese | high |
| Max Capacity | 3 | |
| *Assigned Request* | *132* | |
| *Assigned Request* | *526* | |
| *Remaining Capacity* | *1* | |

Representation of a Request Data Structure

Representation of an Assignment Data Structure

SYSTEMS AND METHODS FOR PROVIDING DYNAMIC AND REAL TIME SIMULATIONS OF MATCHING RESOURCES TO REQUESTS

BACKGROUND

In many industries, requests for resources occur almost constantly, and the task of assigning the resources to the requests is on-going. Computerized methods of assigning resources to requests have been developed and often have to deal with assigning resources based on conflicting constraints. Some computerized methods may be sufficient for some resource management environments but may be insufficient for others. Similarly, some computerized methods may be sufficient for some request scenarios but not for others for a particular resource management environment. The ability to know in advance how well a particular computerized method will work under various conditions in a particular resource management environment has been lacking.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed that provide a dynamic and real time simulation of matching resources to requests. Data representing problem instances are generated with the goal of assigning a set of available resources to a set of incoming requests during an on-going simulation session. Multiple iterations of the simulation are performed during a simulation session. For each iteration of a simulation session, simulation state parameters are updated and assignments of resources to requests are tracked along with new requests and requests that remain unassigned. Such an iterative approach allows for the modeling of the dynamic and real time nature of a resource management environment.

In one embodiment, for a simulation session, data structures representing resources and requests are generated by a dynamic instance simulator and communicated to an assignment logic (e.g., a constraint solver). The assignment logic attempts to assign the resources to the requests and communicates the assignment solution back to the dynamic instance simulator. Simulation state parameters are updated by the dynamic instance simulator based on the assignment solution, and the data structures representing the resources and the requests are updated based on the updated simulation state parameters. The updated data structures are communicated to the assignment logic and the process continues in an iterative manner until the simulation session is stopped.

The following terms are used herein with respect to various embodiments.

The term "resource", as used herein, refers to a computerized representation of: a human resource such as, for example, a call center agent; a computer resource such as, for example, a server computer; or a material resource such as, for example, construction equipment, tools, or raw materials.

The term "request", as used herein, refers to a computerized representation of an expressed demand for a resource.

The term "tracking", as used herein, refers to the computerized monitoring and recording of data related to, for example, assignments of resources to requests, requests that remain unassigned, new requests, and new resources.

The phrases "assigning requests to resources" and "assigning resources to requests" are considered equivalent herein.

The terms "assigning" and "matching" are used interchangeably herein.

The term "constraint solver", as used herein, refers to at least an algorithm that uses constraint programming techniques to attempt to match requests to resources. A constraint solver is a specific type of assignment algorithm or assignment logic.

Figure 1:
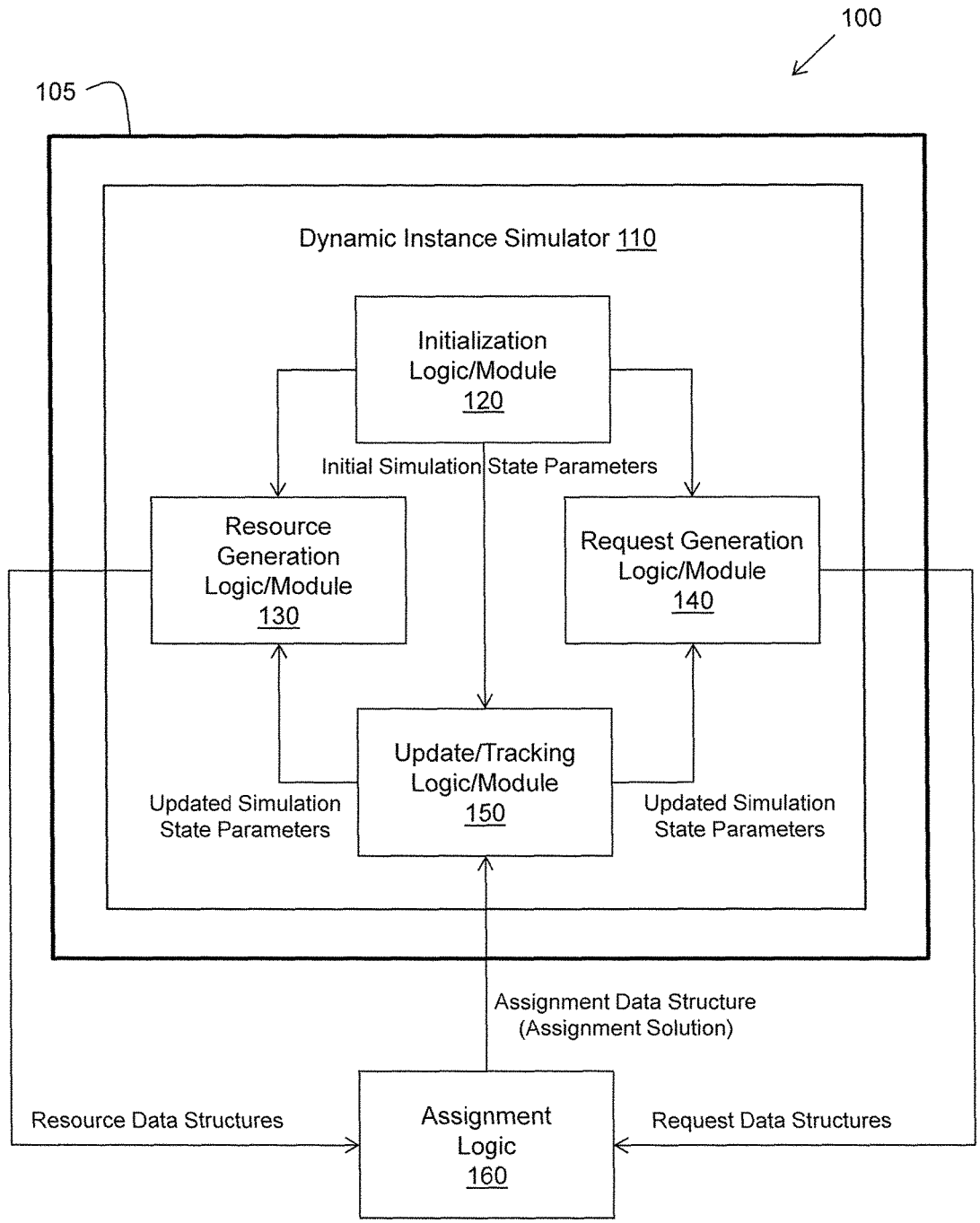
FIG. 1 illustrates one embodiment of a computer system having a computing device configured with a dynamic instance simulator.

FIG. 1 illustrates one embodiment of a computer system 100 having a computing device 105 configured with a dynamic instance simulator 110 and assignment logic 160. In one embodiment, the dynamic instance simulator 110 is part of a larger computer application (e.g., a computerized constraint solver application), configured to help develop assignment logics. The dynamic instance simulator 110 is configured to computerize the process of generating and updating test data that simulates incoming requests that are to be matched to available resources, by assignment logic 160, in a dynamic and real time resource management environment. The embodiments described herein take into consideration the changing dynamics of assigned requests, unassigned requests, and new requests in an iterative manner.

In one embodiment, the computer system 100 is a computing/data processing system including an application or collection of distributed applications for enterprise organizations. The applications and computer system 100 may be configured to operate with or be implemented as a cloud-based networking system, a software-as-a-service (SaaS) architecture, or other type of computing solution.

With reference to FIG. 1, in one embodiment, the dynamic instance simulator 110 is implemented on the computing device 105 and includes logics or modules for implementing various functional aspects of the dynamic instance simulator 110. The dynamic instance simulator 110 generates "instances" of requests and resources to be matched to each other. In one embodiment, the dynamic instance simulator 110 includes initialization logic/module 120, resource generation logic/module 130, request generation logic/module 140, and update/tracking logic/module 150. In one embodiment, assignment logic 160 is implemented on a different computing device and is configured to interact with the dynamic instance simulator 110 (e.g., via network communications). In another embodiment, assignment logic 160 is implemented on the same computing device 105 as the dynamic instance simulator 110.

Other embodiments may provide different logics or combinations of logics that provide the same or similar functionality as the dynamic instance simulator 110 of FIG. 1. In one embodiment, the dynamic instance simulator 110 is an executable application including algorithms and/or program modules configured to perform the functions of the logics. The application is stored in a non-transitory computer storage medium. That is, in one embodiment, the logics of the dynamic instance simulator 110 are implemented as modules of instructions stored on a computer-readable medium.

In one embodiment, the computer system 100 is a centralized server-side application that provides at least the functions disclosed herein and that is accessed by many users via computing devices/terminals communicating with the computer system 100 (functioning as the server) over a computer network. Other embodiments may provide different computers and logics or combinations of computers and logics that provide the same or similar functionality as the system 100 of FIG. 1. In one embodiment, the logics of FIG. 1 form an executable application including algorithms and/or program modules configured to perform the functions of the logics. The application is stored in a non-transitory computer storage medium. That is, in one embodiment, the various logics of the system 100 are implemented as modules of instructions stored on a computer-readable medium.

The dynamic instance simulator 110 can be used to "exercise" and evaluate assignment logic 160 to determine, for example, how well assignment logic 160 handles different types of dynamic request/resource matching scenarios. This can be very useful for a developer of assignment logic (e.g., a constraint solver). For example, the developer of assignment logic 160 may modify the matching algorithm of assignment logic 160 to make the matching algorithm more robust by improving performance over the different dynamic scenarios presented by the simulator 110 as test data.

Furthermore, the dynamic instance simulator 110 can be used to evaluate a particular resource management environment having a particular number and type of resources. For example, a call center business may have a fixed number of human agents (resources) each having a particular set of skills and skill levels. Furthermore, the call center business may have a history of knowing approximately how many requests (e.g., customer requests for help with personal computer problems) that the business receives per hour during normal business hours. The dynamic instance simulator 110 can be initialized to simulate such conditions, in a dynamic and real time manner, and evaluate performance based on assignment logic 160 used by the call center business. For example, the call center business may conclude that it needs to add more agents, or increase the skill levels of the agents, to properly handle the requests (i.e., to achieve the desired performance). Alternatively, the call center business may conclude that it needs to find a better assignment logic (e.g., a better constraint solver).

The term "performance", as used herein, can refer to one or more criterion, or some hybrid of two or more criterion. For example, one performance criterion may be how long a request has to wait before a resource is assigned to the request. Another performance criterion may be how long it takes for a request to be resolved after being assigned. Still another performance criterion may be how many resources get assigned to a request before the request is resolved. Other performance criteria are possible as well such as, for example, how well resources are matched to requests.

Referring again to FIG. 1, in one embodiment, initialization logic 120 is configured to initialize simulation state parameters, of a simulation session, that include a number of resources and a number of requests to be assigned to the resources. In one example, the number or resources may be initialized to ten (10) agents and the number of requests may be initialized to 20 (twenty) requests to be handled by the agents. That is, the simulation session is initialized such that the ten (10) resources are to be matched to (assigned to) the twenty (20) requests during the simulation session, if possible. Other simulation state parameters are discussed later herein with respect to at least FIG. 2 and FIG. 3.

In general, initialization of the simulation state parameters defines the initial state of a simulation session. Simulation state parameters may be initialized based on specified parameters, or more randomly based on techniques that use probability distributions along with random number generation. In one embodiment, some of the initialized simulation state parameters from initialization logic 120 are provided to resource generation logic 130, and other initialized simulation state parameters are provided to request generation logic 140. The simulation state parameters are subsequently updated as iterations of the simulation session proceed.

In one embodiment, resource generation logic 130 is configured to generate multiple resource data structures corresponding to the number of resources as initialized by initialization logic 120, or as subsequently updated during a simulation session. Each resource data structure includes resource data that simulates characteristics of a resource (e.g., characteristics of a human agent). As with simulation state parameters, resource data may be specified or generated randomly as part of generating a resource data structure.

Figure 2:
FIG. 2 illustrates an example embodiment of a representation of a resource data structure that can be generated by the dynamic instance simulator of FIG. 1.

FIG. 2 illustrates an example embodiment of a representation of a resource data structure 200 that can be generated by resource generation logic 130. The resource data structure 200 is illustrated in the form of a table having data fields. The resource data in the resource data structure 200 includes a characteristic associated with identification of the resource (Agent ID), characteristics associated with skills of the resource (Skill/Level), characteristics associated with languages of the resource (Language/Level), characteristics associated with requests assigned to the resource (Assigned Requests), and a characteristic defining a maximum capacity of the resource (Max Capacity).

In the resource data structure 200 of FIG. 2, the resource is an agent (e.g., a human agent) having an identification number of 50914. The agent is skilled with respect to troubleshooting problems associated with laptop computers, cell phones, and tablet computers. The agent has a high skill level with respect to laptop computers, a low skill level with respect to cell phones, and a medium skill level with respect to tablet computers. The agent also speaks Chinese at a high level of fluency and English at a medium level of fluency. Furthermore, the agent is able to handle a maximum number of three (3) requests at the same time (Max Capacity). Again, the resource data may be specified or generated randomly as part of generating the resource data structure 200.

The resource data structure 200 of FIG. 2 also includes two simulation state parameters (Assigned Request) having values of 132 and 526, respectively. That is, the agent is currently assigned to handle two (2) requests (request ID 132 and request ID 526). The resource data structure 200 of FIG. 2 also includes a simulation state parameter (Remaining Capacity) having a value of one (1) and indicating that the agent is currently handling two (2) requests and is able to handle one more (i.e., Max Capacity−Remaining Capacity=3−1=2). The simulation state parameter of Remaining Capacity may have been previously initialized to zero (0) by initialization logic 120 and provided to resource generation logic 130 to be used in the resource data structure 200, in accordance with one embodiment. Remaining Capacity could be initialized to other values (e.g., 1, 2, or 3) to simulate that the associated agent (resource) is already busy at the start of the simulation session. As the simulation session progresses, Remaining Capacity is updated to reflect how many additional requests the agent can take on for any current iteration of the simulation session. Again, each resource, specified by the number of resources determined by initialization logic 120, has its own associated resource data structure.

In accordance with one embodiment, simulation state parameters are updated as a simulation session proceeds from iteration-to-iteration. Resource data remains fixed upon being first generated by resource generation logic 140. The updating of simulation state parameters is discussed in more detail later herein.

In one embodiment, request generation logic 140 is configured to generate multiple request data structures corresponding to the number of requests as initialized by initialization logic 120 or as subsequently updated during a simulation session. Each request data structure includes request data that simulates characteristics of a request (e.g., characteristics of a customer problem). As with simulation state parameters, request data may be specified or generated randomly as part of generating a request data structure.

Figure 3:
FIG. 3 illustrates an example embodiment of a representation of a request data structure that can be generated by the dynamic instance simulator of FIG. 1.

FIG. 3 illustrates an example embodiment of a representation of a request data structure 300 that can be generated by request generation logic 140. The request data structure 300 is illustrated in the form of a table having data fields. Referring to FIG. 3, the request data in the request data structure 300 includes a characteristic associated with identification of the request (Request ID), characteristics associated with a skill demanded by the request (Demand Skill/Level), and characteristics associated with a language demanded by the request (Demand Lang/Level).

In the request data structure 300 of FIG. 3, the request is for help with a laptop computer and has a Request ID of 132. The resource assigned to handle the request should have at least a medium skill level in troubleshooting laptop computers. The resource assigned to handle the request should also have a high level of fluency in the Chinese language. Again, the request data may be specified or generated randomly as part of generating the request data structure 300.

The request data structure 300 of FIG. 3 also includes several simulation state parameters including Priority Level, Wait Time, Process Time, Duration, Assign ID, and Active Flag. These simulation state parameters are initialized by initialization logic 120, and then subsequently updated as the simulation session proceeds from state-to-state (iteration-to-iteration). Currently, the Priority. Level is Gold which is a mid-level priority for this request (e.g., Standard, Gold, Platinum may be the options). In general, the higher the Priority Level, the sooner the request should be serviced. The Wait Time is 24, which is the number of simulation iterations of the simulation session that the request has waited to be assigned to a resource. The Priority Level can change during a simulation session. For example, a Priority Level may be increased from Gold to Platinum if the Wait time becomes too long. The Wait Time is updated (e.g., incremented) as the simulation session progresses to reflect the number of simulation iterations that the request has waited to be assigned. The Process Time is 15, which is the number of simulation iterations of the simulation session that have passed since the request has been assigned to a resource. The Process Time is updated (e.g., incremented) as the simulation session progresses to reflect the number of iterations that have passed since the request has been assigned.

Furthermore, in the request data structure 300 of FIG. 3, the Duration 17 is the estimated number of simulation iterations of the simulation session needed for the request to be finalized (completed) once the request is assigned. In the real world, finalizing or completing a request may correspond to solving a customer's problem, for example. The Duration is updated (e.g., decremented) as the simulation session progresses to reflect the estimated number of iterations needed for the request to be finalized once assigned. The Assign ID is 50914, meaning that the request 132 has been assigned to agent 50914 (as simulated in FIG. 2). As seen in FIG. 2, agent 50914 has high skill in laptops and high fluency in Chinese, thereby meeting the demand criteria of the request 132. The Assign ID may be updated as the simulation session progresses, for example, if a different or an additional agent is assigned to the request. A request remains active during a simulation session while a resource is not assigned to the request. Therefore, the Active Flag has a value of "no", meaning that the request has been assigned. The Active Flag may be updated as the simulation session progresses to reflect any change in whether the request is assigned. Again, each request, specified by the number of requests determined by initialization logic 120, has its own associated request data structure.

Again, in accordance with one embodiment, simulation state parameters are updated as a simulation session proceeds from iteration-to-iteration. Request data remains fixed upon being first generated by request generation logic 140. The updating of simulation state parameters is discussed in more detail later herein.

In one embodiment, the resource data structures and the request data structures are communicated from the dynamic instance simulator 110 to assignment logic 160 (e.g., by resource generation logic 130 and request generation logic 140, respectively). In one embodiment, assignment logic 160 is a constraint solver logic that uses constraint programming techniques in an attempt to match the resources (as represented by the resource data structures) to the requests (as represented by the request data structures). Assignment logic 160 generates an assignment solution in the form of an assignment data structure having assignment data. An assignment solution is generated for each iteration of the simulation session. Any particular assignment solution for any particular iteration may result in all, some, or none of the requests being assigned to a resource.

Figure 4:
FIG. 4 illustrates an example embodiment of a representation of an assignment data structure that can be received by the dynamic instance simulator of FIG. 1.

For example, FIG. 4 illustrates an example embodiment of a representation of an assignment data structure 400 that can be generated by assignment logic 160 and received by the dynamic instance simulator 110. The assignment data structure 400 represents an assignment solution for iteration number 64 of a simulation session. As seen in the assignment data structure 400, various assignments of requests to agents, Assign (req ID/agent ID), have been made. For example, the assignment data structure 400 shows that resource (agent) 50914 has been assigned to request 132. However, there are two requests (243 and 158) to which resources (agents) have not yet been assigned. These two requests may likely be assigned during some later iteration of the simulation session. Furthermore, FIG. 4 shows multiple requests that have been assigned to resource (agent) 50914, illustrating the multi-assignment nature of various embodiments. A description of one embodiment of a constraint solver algorithm is provided below herein under the section entitled "Constraint Solver Algorithm Embodiment".

Once an assignment data structure is generated by assignment logic 160 for a particular iteration of a simulation session, the assignment data structure is provided to and received by the dynamic instance simulator 110. In one embodiment, update/tracking logic 150 is configured to receive the assignment data structure and update the simulation state parameters based at least in part on the assignment data structure. For example, for the current iteration of the simulation session, the Wait Time of a request is updated by incrementing the value of the Wait Time by one (1), if the request has not yet been assigned, since the iteration number has increased by one (1).

Similarly, update/tracking logic 150 can update the Remaining Capacity simulation state parameter for each resource based on the assignments indicated in the assignment data structure for the current iteration. Also, update/tracking logic 150 can update the Priority Level, Wait Time, Process Time, Duration, Assign ID, and Active Flag simulation state parameters for each request based on the iteration number and the assignments indicated in the assignment data structure for the current iteration.

Update/tracking logic is also configured to provide the appropriate updated simulation state parameters (e.g., Assigned Request and Remaining Capacity for the resources) to resource generation logic 130. Similarly, update/tracking logic is configured to provide the appropriate updated simulation state parameters (e.g., Priority Level, Wait Time, Process Time, Duration, Assign ID, and Active Flag) to request generation logic 140. Then resource generation logic 130 and request generation logic 140 can update or re-generate the resource data structures and the request data structures, respectively, based on the updated simulation state parameters.

The processing loop (i.e., updating simulation state parameters, generating updated resource and request data structures, providing the resource and request data structures to assignment logic (e.g., a constraint solver), and generating a new assignment solution) iteratively continues until the simulation session is stopped. The iterations of the simulation session, taken together, simulate a dynamic and real time resource management environment.

In one embodiment, one or more new resources may be added to (or one or more resources may be subtracted from) the simulation session on any given iteration. For example, for a particular iteration, update/tracking logic 150 may increment (or decrement) the number of resources (a simulation state parameter) and pass the updated number of resources along to resource generation logic 130, along with the other updated simulation state parameters. In one embodiment, update/tracking logic 150 applies a random number generator to a Poisson distribution to determine whether to increment (or decrement) the number of resources for the next iteration. The Poisson distribution determines the rate at which new resources are generated (or current resources are removed). Resource generation logic 130 is configured to detect the change in the number of resources and generate the associated additional resource data structures for added resources. In this way, the coming and going of agents in a resource management environment can be simulated.

Similarly, in one embodiment, one or more new requests may be added to (or one or more requests may be subtracted from) the simulation session on any given iteration. For example, for a particular iteration, update/tracking logic 150 may increment (or decrement) the number of requests (a simulation state parameter) and pass the updated number of requests along to request generation logic 140, along with the other updated simulation state parameters. In one embodiment, update/tracking logic 150 applies a random number generator to a Poisson distribution to determine whether to increment (or decrement) the number of requests for the next iteration. The Poisson distribution determines the rate at which new incoming requests are generated (or current requests are removed) and can be set to simulate low, regular, and high load conditions. Request generation logic 140 is configured to detect the change in the number of requests and generate the associated additional request data structures for added requests.

In one embodiment, update/tracking logic 150 is configured to track (for each iteration) assignments of resources to requests, requests that remain unassigned, new requests (as generated by request generation logic 130 as new request data structures), and new resources (as generated by resource generation logic 140 as new resource data structures). The tracked data can later be analyzed offline to evaluate performance during the simulation session.

In this manner, the dynamic instance simulator can work with any assignment logic (e.g. any constraint solver) that is compatible with the simulator to receive resource and request data structures and provide assignment data structures. The underlying algorithm, of the assignment logic, that actually attempts to perform assignments of resources to requests can take on many different forms and does not dictate or limit embodiments of the dynamic instance simulator.

Figure 5:
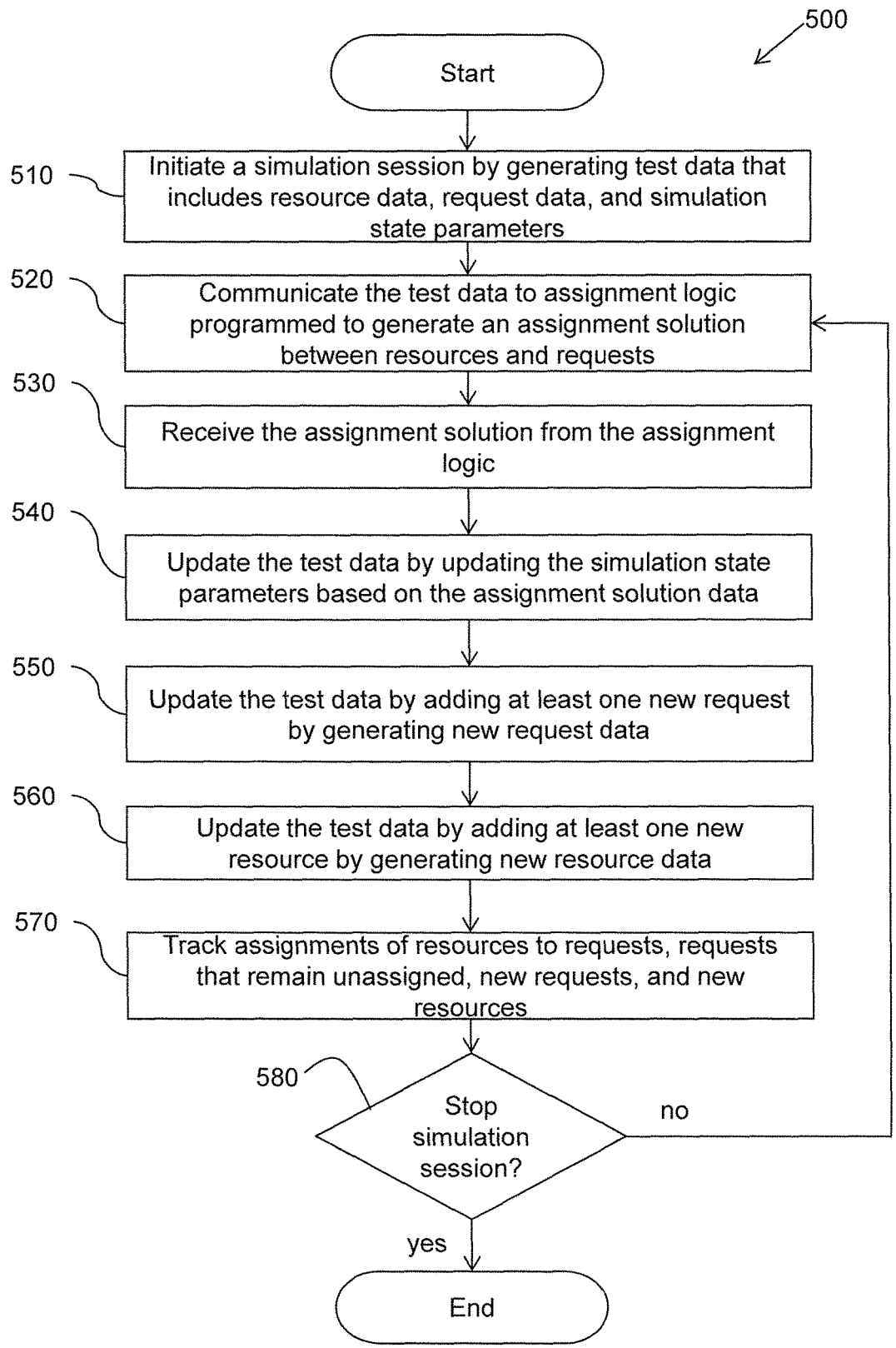
FIG. 5 illustrates one embodiment of a method which can be performed by the dynamic instance simulator of FIG. 1 to dynamically assign resources to requests.

FIG. 5 illustrates one embodiment of a method 500 which can be performed by the dynamic instance simulator 110 of FIG. 1 to dynamically assign resources to requests. Method 500 describes operations of the system 100 of FIG. 1 and is implemented to be performed by the system 100 of FIG. 1, or by a computing system configured with an algorithm of the method 500. For example, in one embodiment, method 500 is implemented by a computing system configured to execute a computer application. The computer application is configured to process data in electronic form and includes stored executable instructions that perform the functions of method 500.

Method 500 will be described from the perspective of the system 100 of FIG. 1 where the dynamic instance simulator 110 interacts with assignment logic 160. Method 500 is performed by the dynamic instance simulator 110. Assignment logic 160 can be viewed as a "black box" that receives test data (resource data, request data, simulation state parameters) from the dynamic instance simulator 110, attempts to match or assign resources to requests, and provides an assignment solution back to the dynamic instance simulator 110. The exact nature of the matching algorithm of assignment logic 160 that performs the matching (assigning) can vary and does not dictate or limit embodiments of the dynamic instance simulator 110.

Upon initiating method 500, at block 510, a simulation session is initiated by generating test data. The test data includes resource data that simulates characteristics of multiple resources, request data that simulates characteristics of multiple requests, and simulation state parameters that characterize a simulation state of the simulation session. In one embodiment, the resource data is generated by resource generation logic 130 in the form of resource data structures, the request data is generated by request generation logic 140 in the form of request data structures, and the simulation state parameters are generated and initialized by initialization logic 120 of FIG. 1 and included in the resource and request data structures. The test data may be generated non-randomly by specifying the test data, randomly by applying a random number generator to a probability distribution, or as some combination of the two.

At block 520, the test data (e.g., in the form of resource and request data structures) is communicated to assignment logic (e.g., a constraint solver). The assignment logic is programmed to generate an assignment solution by attempting to assign the multiple resources to the multiple requests as simulated and constrained by the test data. The exact nature of how the assignment logic assigns resources to requests does not limit the method 500. However, in at least one embodiment, the assignment logic uses constraint programming techniques to perform the assignments.

At block 530, the assignment solution is received from the assignment logic. In one embodiment, the assignment solution is in the form of an assignment data structure having assignment solution data. In embodiments where the assignment logic is implemented on a separate computing device than the dynamic instance simulator, communication between the assignment logic and the dynamic instance simulator may take place over a computer network (e.g., a LAN, a WAN, the internet).

At blocks 540 to 560, the test data is updated. The test data can be updated at block 540 by updating the simulation state parameters based on the assignment solution data. In one embodiment, the updating of the simulation state parameters is performed by update/tracking logic 150 of FIG. 1. Some examples of updating the simulation state parameters based at least in part on the assignment solution data include: incrementing or decrementing a value of at least one simulation state parameter based on a number of a current iteration of a simulation session; changing a value of a remaining capacity parameter for a resource based on current assignments of the resource to requests; and increasing a priority level of a priority level parameter for a request based on a number of a current iteration of a simulation session and the request not being assigned.

Also, at block 550, the test data can be updated by adding one or more new requests to the multiple requests by generating new request data that simulates characteristics of the new requests. In one embodiment, the new request data is generated by request generation logic 140 of FIG. 1. Furthermore, at block 560, the test data can be updated by adding one or more new resources to the multiple resources by generating new resource data that simulates characteristics of the new resources. In one embodiment, the new resource data is generated by resource generation logic 130. The rate at which new resources or new requests are introduced during the simulation session may be controlled by applying a random number generator to a Poisson distribution to determine whether to increment the number of resources or requests for the next iteration. During some iterations of method 500, new requests and/or new resources may not be added, in accordance with one embodiment.

At block 570, assignments of resources to requests, requests that remain unassigned, new requests, and new resources are tracked. In one embodiment, update/tracking logic 150 of FIG. 1 performs the tracking. The tracking involves the computerized monitoring and recording of data related to, for example, assignments of resources to requests, requests that remain unassigned, new requests, and new resources.

At block 580, a decision is made with respect to stopping the simulation session. If the simulation session is not to be stopped at the current iteration, the method 500 reverts back to block 520 where the test data, as updated, is communicated to the assignment logic. The method iterates between blocks 520 and 580 until the simulation session is stopped. In one embodiment, a decision to stop the simulation session may be made at block 580 once all requests have been serviced (i.e., assigned and finalized). In another embodiment, a decision to stop the simulation session may be made at block 580 once a specified number of iterations have been reached. Other criteria for stopping the simulation session may be defined as well, in accordance with other embodiments.

In this manner, an iterative process simulates a dynamic and real time resource management environment that supports developers in evaluating assignment logics (e.g., constraint solver algorithms) and supports users (e.g., businesses) in evaluating current resources and skill sets. The process can operate with any assignment logic, independent of the exact nature of the assignment logic algorithm, as long as the data sets that are communicated during the process are compatible with the assignment logic.

Various different criteria such as, for example, low load vs. high load, under staffing vs. over staffing, highly skilled staff vs. identical staff, and multiple priority orders can be used to stress test assignment logics and business models. Potential performance bottlenecks and system behavior can be uncovered before committing to any particular solution approach. Furthermore, given access to a random number generator and a specific seed value, the test data is reproducible for future reference.

Computing Device Embodiment

Figure 6:
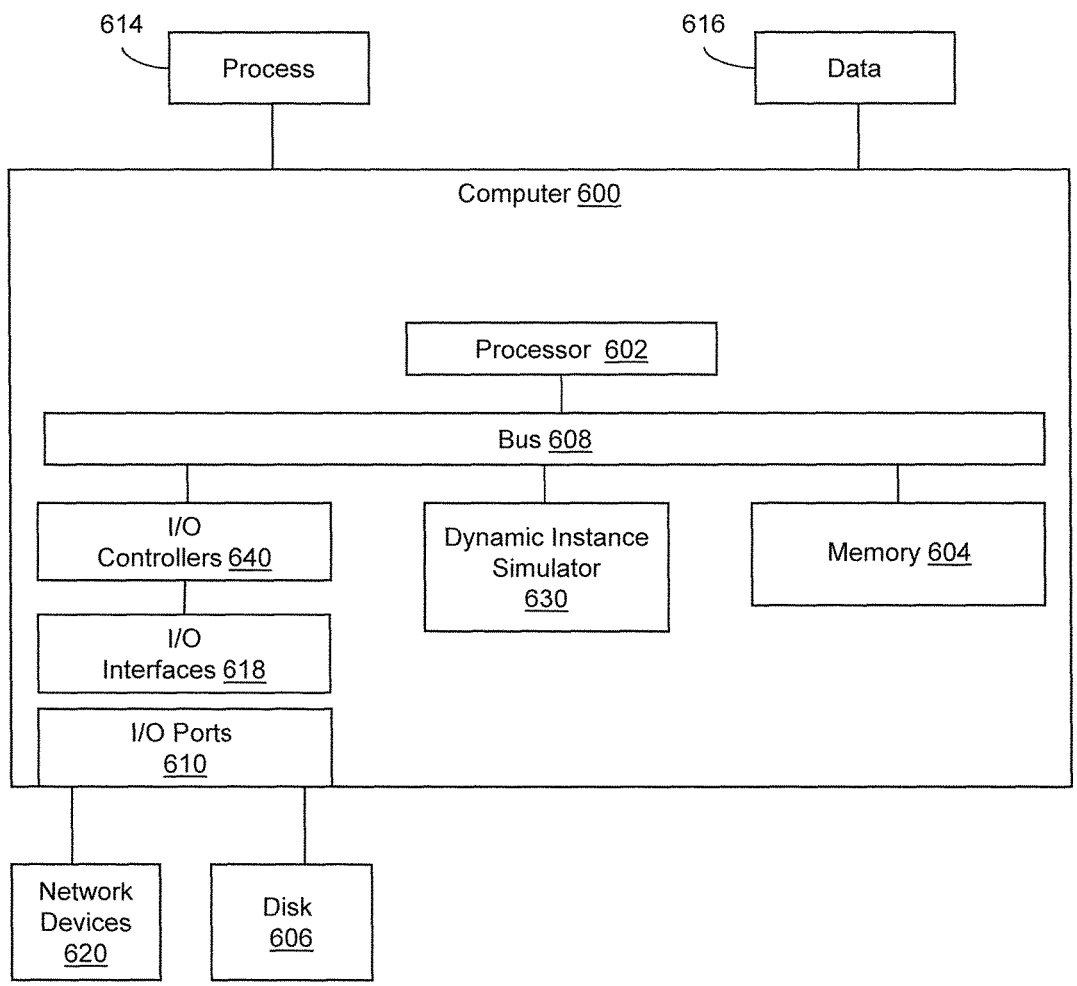
FIG. 6 illustrates one embodiment of a computing device upon which the dynamic instance simulator of FIG. 1 may be implemented.

FIG. 6 illustrates an example computing device that is configured and/or programmed with one or more of the example systems and methods described herein, and/or equivalents. FIG. 6 illustrates one example embodiment of a computing device upon which an embodiment of a dynamic instance simulator may be implemented. The example computing device may be a computer 600 that includes a processor 602, a memory 604, and input/output ports 610 operably connected by a bus 608.

In one example, the computer 600 may include dynamic instance simulator 630 (e.g. corresponding to dynamic instance simulator 110 from FIG. 1). In different examples, simulator 630 may be implemented in hardware, a non-transitory computer-readable medium with stored instructions, firmware, and/or combinations thereof. While simulator 630 is illustrated as a hardware component attached to the bus 608, it is to be appreciated that in other embodiments, simulator 630 could be implemented in the processor 602, a module stored in memory 604, or a module stored in disk 606.

In one embodiment, simulator 630 or the computer 600 is a means (e.g., structure: hardware, non-transitory computer-readable medium, firmware) for performing the actions described. In some embodiments, the computing device may be configured as a server operating in a cloud computing system, a server configured in a Software as a Service (SaaS) architecture, a smart phone, laptop, tablet computing device, and so on.

The means may be implemented, for example, as an ASIC programmed to generate test data, representing resources and requests, to be input to a constraint solver in an iterative manner. The means may also be implemented as stored computer executable instructions that are presented to computer 600 as data 616 that are temporarily stored in memory 604 and then executed by processor 602.

Simulator 630 may also provide means (e.g., hardware, non-transitory computer-readable medium that stores executable instructions, firmware) for generating test data, representing resources and requests, to be input to a constraint solver in a dynamic and real time manner.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

Constraint Solver Algorithm Embodiment

In one embodiment, a constraint solver includes a model configured to capture the combinatorial structure of the agent/request assignment problem presented. The model is combined with a customizable search heuristic geared toward finding the best agent/request matching. The constraint model includes a set of variables, each of which can take a value from a set of possible values called a domain. Restrictions, called constraints, exist on the combinations of values.

Request variables correspond to requests and count variables account for the number of requests assigned to an agent. There is a one-to-one mapping between the request variables and the requests. Each request is treated as an integer variable with a domain that includes the agents that speak the demanded language. Language compatibility is implicitly guaranteed via the domains.

Given that some requests may not have an available agent at a particular time, a wildcard agent that is capable of serving any request is introduced into each domain. As a result, the model is guaranteed to have a feasible solution while an assignment to the wildcard agent indicates an unmatched request. In order to count the number of times an agent is assigned to a request, a counting variable is created for each agent within a domain from 0 (no assignment) to the number of available slots that the agent currently has. Agents may have different capacities based on their experience level. The upper bound in each domain implicitly enforces the maximum capacity of an agent. The domain for the wildcard agent is from 0 to the number of requests.

The request variables and the counting variables are linked to each other by a global counting constraint. The global counting constraint ensures that when a request variable is assigned to an agent, the corresponding counting variable for that agent is incremented by one. This operator encapsulates a complex filtering algorithm based on advanced graph theoretic notions such as strongly connected components and generalized bipartite matching. Strong inference is performed based on the lower and upper bound of the counting variables and the domains of a request variable. This allows the removal of infeasible assignments before trying the committing to forbidden assignments and greatly reduces the potentially exponential search space.

Given a constraint model, the constraint solver uses general-purpose variable and value selection heuristics to find a solution. The choice of the variable and value heuristic can be customized easily to direct the search into preferred solutions. Requests can be sorted first by priority and then by wait time, which yields to a natural variable ordering heuristic. The search proceeds by selecting one variable and then assigning a value to it. This triggers propagation and the constraints of the model remove values from the domain of other variables that are inferred to be in conflict with this decision. Once the propagation mechanism reaches a fixed point (also known as idempotency), the process continues with the selecting of the next variable.

Given a variable (in this case, a request), the next step is to find a value (in this case, an agent) to assign to the variable. Agents can be selected as directed by a "best" matching heuristic. In one embodiment, a best agent matching heuristic treats priority requests in a special manner. If it is possible, priority requests are assigned to the most skillful agent for the task. Otherwise, priority requests are still matched with an agent having the same language. Contrarily, a standard request would have to wait to be matched.

Again, without loss of generality, the value selection heuristic can be modified to serve other purposes. For example, among the most skillful agents, the agent with the least current load can be favored based on the value of the corresponding counting variable to balance the work among the agents.

Systems, methods, and other embodiments have been described that are configured to simulate requests and resources to be assigned to the requests by assignment logic (e.g., a constraint solver). In one embodiment, a simulation session is initiated at least in part by generating simulation state parameters that include a number of resources and a number of requests to be assigned to the resources. A plurality of resource data structures is generated, corresponding to the number of resources, based at least in part on a portion of the simulation state parameters. Each resource data structure includes resource data that simulates characteristics of one resource. A plurality of request data structures is generated, corresponding to the number of requests, based at least in part on a portion of the simulation state parameters. Each request data structure includes request data that simulates characteristics of one request to be assigned to at least one resource. The resource data structures and the request data structures are communicated to the assignment logic. The assignment logic is programmed to generate an assignment solution by attempting to assign resources, as simulated by the resource data, to requests, as simulated by the request data. The assignment solution is received from the assignment logic as an assignment data structure. The simulation state parameters are updated based at least in part on the assignment data structure.

In one embodiment, initialization logic is configured to initialize simulation state parameters, of a simulation session, that include a number of resources and a number of requests to be assigned to the resources. Resource generation logic is configured to generate a plurality of resource data structures corresponding to the number of resources. Each resource data structure includes resource data that simulates characteristics of one resource. Request generation logic is configured to generate a plurality of request data structures corresponding to the number of requests. Each request data structure includes request data that simulates characteristics of one request to be assigned to at least one resource by assignment logic. Update/tracking logic is configured to receive an assignment data structure from the assignment logic and update the simulation state parameters based on the assignment data structure. The assignment data structure includes assignment data representing resources that have been assigned to requests by the assignment logic. The updated simulation state parameters can be fed back into resource generation logic and request generation logic and the process can repeat until the simulation session is stopped.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computing device that includes at least one processor for executing instructions from a memory, the method comprising:
    (i) initiating a simulation session at least in part by generating test data, via the at least one processor, wherein the test data includes:
        resource data that simulates characteristics of a plurality of resources,
        request data that simulates characteristics of a plurality of requests, and
        simulation state parameters that characterize a simulation state of the simulation session;
    (ii) communicating the test data, via the at least one processor, to an assignment logic programmed to generate assignment solution data by attempting to assign the plurality of resources to the plurality of requests as simulated and constrained by the test data, wherein the assignment logic executes a constraint solver upon a constraint model to implement a matching heuristic that selects resource values within the resource data to assign to request variables within the request data;
    (iii) receiving the assignment solution data from the assignment logic, via the at least one processor;
    (iv) updating the test data, via the at least one processor, by:
        updating the simulation state parameters based at least in part on the assignment solution data; and
        adding at least one of a new request to the plurality of requests at least in part by generating new request data that simulates characteristics of the new request or a new resource to the plurality of resources at least in part by generating new resource data that simulates characteristics of the new resource; and
    (v) iteratively repeating steps (ii) to (iv) until the simulation session is stopped.

2. The method of claim 1, further comprising, for each iteration of the simulation session, tracking via the at least one processor at least one of:
    assignments of resources to requests;
    requests that remain unassigned;
    new requests; and
    new resources.

3. The method of claim 1, wherein the resource data is generated, via the at least one processor, at least in part by applying a random number generator to at least one probability distribution representing at least one characteristic of at least one resource of the plurality of resources.

4. The method of claim 1, wherein the request data is generated via the at least one processor, at least in part, by applying a random number generator to at least one probability distribution representing at least one characteristic of at least one request of the plurality of requests.

5. The method of claim 1, wherein the resource data is generated via the at least one processor, at least in part, non-randomly based on specified parameters.

6. The method of claim 1, wherein the request data is generated via the at least one processor, at least in part, non-randomly based on specified parameters.

7. The method of claim 1, wherein the adding at least one new request is initiated, via the at least one processor, at least in part by applying a random number generator to a Poisson distribution.

8. The method of claim 1, wherein the adding at least one new resource is initiated, via the at least one processor, at least in part by applying a random number generator to a Poisson distribution.

9. The method of claim 1, wherein the characteristics of the plurality of resources include skills and associated skill levels, and the characteristics of the plurality of requests include demanded skills and demanded skill levels.

10. The method of claim 1, wherein updating the simulation state parameters, via the at least one processor, based at least in part on the assignment solution data includes at least one of:
    incrementing a value of at least one simulation state parameter based on a number of a current iteration of the simulation session;
    decrementing a value of at least one simulation state parameter based on the number of the current iteration of the simulation session;
    changing a value of a remaining capacity parameter for at least one resource based on current assignments of the at least one resource to requests; and
    increasing a priority level of a priority level parameter for at least one request based on the number of the current iteration of the simulation session and the at least one request not being assigned.

11. A computing system, comprising:
    an initialization module stored in a non-transitory computer readable medium including instructions that when executed cause a processor to initialize simulation state parameters, of a simulation session, that include a number of resources and a number of requests to be assigned to the resources;
    a resource generation module stored in the non-transitory computer readable medium including instructions that when executed cause the processor to generate resource data that simulates characteristics of a plurality of resources corresponding to the number of resources;
    a request generation module stored in the non-transitory computer readable medium including instructions that when executed cause the processor to generate request data that simulates characteristics of a plurality of requests, corresponding to the number of requests, to be assigned to the plurality of resources by an assignment logic, wherein the assignment logic executes a constraint solver upon a constraint model to implement a matching heuristic that selects resource values within the resource data to assign to request variables within the request data; and
    an update/tracking module stored in the non-transitory computer readable medium including instructions that when executed cause the processor to:
        receive assignment solution data from the assignment logic;
        update the simulation state parameters based at least in part on the assignment solution data, wherein the assignment solution data represents at least resources assigned to requests; and
        add at least one of a new request to the plurality of requests at least in part by generating new request data that simulates characteristics of the new request or a new resource to the plurality of resources at least in part by generating new resource data that simulates characteristics of the new resource.

12. The computing system of claim 11, wherein the update/tracking module stored in the non-transitory computer readable medium further includes instructions that when executed cause the processor to track at least one of:
    assignments of resources to requests;
    requests that remain unassigned;
    new requests; and
    new resources.

13. The computing system of claim 11, wherein the resource generation module stored in the non-transitory computer readable medium further includes instructions that when executed cause the processor to communicate the resource data to the assignment logic.

14. The computing system of claim 11, wherein the request generation module stored in the non-transitory computer readable medium further includes instructions that when executed cause the processor to communicate the request data to the assignment logic.

15. The computing system of claim 11, wherein the update/tracking module stored in the non-transitory computer readable medium further includes instructions that when executed cause the processor to communicate at least a portion of the simulation state parameters, as updated, to the resource generation module for a next iteration of the simulation session.

16. The computing system of claim 11, wherein the update/tracking module stored in the non-transitory computer readable medium further includes instructions that when executed cause the processor to communicate at least a portion of the simulation state parameters, as updated, to the request generation module for a next iteration of the simulation session.

17. The computing system of claim 11, wherein the new request and the new resource are added based upon the assignment solution data.

18. A non-transitory computer-readable medium storing instructions that, when executed by one or more processors of a computing device, cause the computing device to at least:
    (i) initiate a simulation session at least in part by generating, via the one or more processors, simulation state parameters that include a number of resources and a number of requests to be assigned to the resources;
    (ii) generate, via the one or more processors, resource data based at least in part on a portion of the simulation state parameters, wherein the resource data simulates characteristics of a plurality of resources corresponding to the number of resources;
    (iii) generate, via the one or more processors, request data based at least in part on a portion of the simulation state parameters, wherein the request data simulates characteristics of a plurality of requests, corresponding to the number of requests, to be assigned to the plurality of resources;
    (iv) communicate, via the one or more processors, the resource data, the request data, and the simulation state parameters to a constraint solver logic, wherein the constraint solver logic is programmed to generate an assignment solution by attempting to assign resources, as simulated by the resource data, to requests, as simulated by the request data, wherein the constraint solver logic executes a constraint solver upon a constraint model to implement a matching heuristic that selects resource values within the resource data to assign to request variables within the request data;

(v) receive, via the one or more processors, the assignment solution from the constraint solver logic as assignment solution data;

(vi) update the simulation state parameters, via the one or more processors, based at least in part on the assignment solution data;

(vii) add at least one of a new request to the plurality of requests at least in part by generating new request data that simulates characteristics of the new request or a new resource to the plurality of resources at least in part by generating new resource data that simulates characteristics of the new resource; and (viii) iteratively repeat steps (ii) to (vii) until the simulation session is stopped.

19. The non-transitory computer-readable medium of claim 18, wherein the instructions further comprise instructions that, when executed by the one or more processors, cause the computing device to track at least one of:
assignments of resources to requests;
requests that remain unassigned;
new requests; and
new resources.

20. The non-transitory computer-readable medium of claim 18, wherein the instructions further comprise instructions that, when executed by the one or more processors, cause the computing device to:
add the new request to the plurality of requests based on the simulation state parameters as updated; and
add the new resource to the plurality of resources based on the simulation state parameters as updated.

* * * * *